United States Patent [19]
Marcell

[11] 3,990,653
[45] Nov. 9, 1976

[54] WHEELED CART FOR CARRYING AND DISPENSING WIRE

[75] Inventor: William B. Marcell, Fort Myers Beach, Fla.

[73] Assignee: Jet Line Products, Inc., Matthews, N.C.

[22] Filed: Jan. 5, 1976

[21] Appl. No.: 646,876

[52] U.S. Cl. ............................ 242/129.8; 242/129; 280/47.17
[51] Int. Cl.² ...................... B65H 49/00; B62B 1/00
[58] Field of Search ............... 242/129, 129.5–129.8, 242/137.1, 86.5, 138; 280/34 B, 35, 41 C, 47.17, 47.34; 211/113, 119

[56] References Cited
UNITED STATES PATENTS

| | | | |
|---|---|---|---|
| 3,172,617 | 3/1965 | Johnson | 242/129.5 |
| 3,178,129 | 4/1965 | Parkinson | 242/129 |
| 3,603,526 | 9/1971 | Payne et al. | 242/129.8 |
| 3,729,092 | 4/1973 | Marcell | 206/389 |
| 3,831,877 | 8/1974 | Bennett et al. | 242/86.5 R |

*Primary Examiner*—Leonard D. Christian
*Attorney, Agent, or Firm*—Bell, Seltzer, Park & Gibson

[57] ABSTRACT

A wheeled cart adapted for facilitating transporting a plurality of coils of wire from one location to another on a construction site and for facilitating withdrawing the wire, as needed. The cart comprises a skeletal frame having a plurality of interconnected vertical upright and horizontal cross members defining open areas therebetween. Dispensers for coiled wire are suspended from certain of the horizontal members, the dispensers each having a generally horizontally oriented supporting base for supporting a coil of wire thereon and being adapted to facilitate freely unreeling the wire from the coil. Means is provided on the horizontal frame members beneath each of the dispensers for restricting lateral movement of the dispensers during movement of the wheeled cart from one location to another and during withdrawing of wire from the dispenser. The cart is also adapted for carrying and dispensing wire from spools. Additionally, the cart may be provided with various arrangements of trays for receiving tools or other small items therein.

17 Claims, 10 Drawing Figures

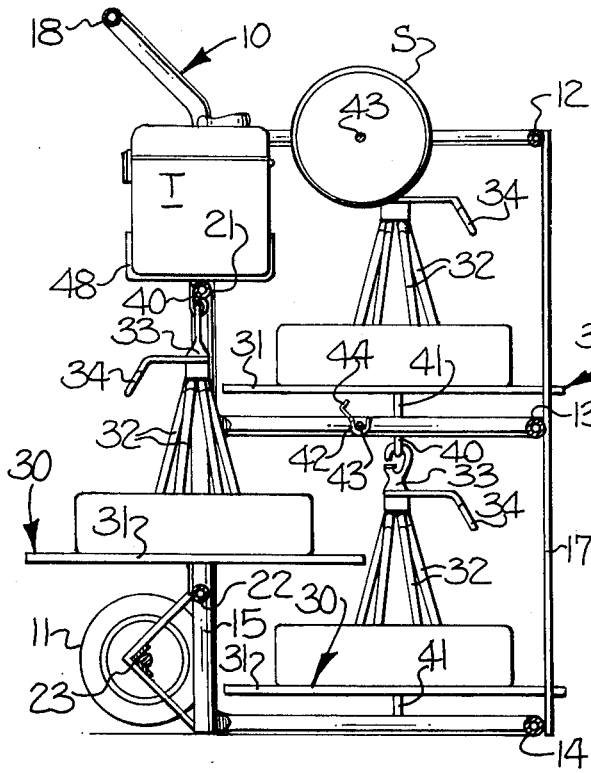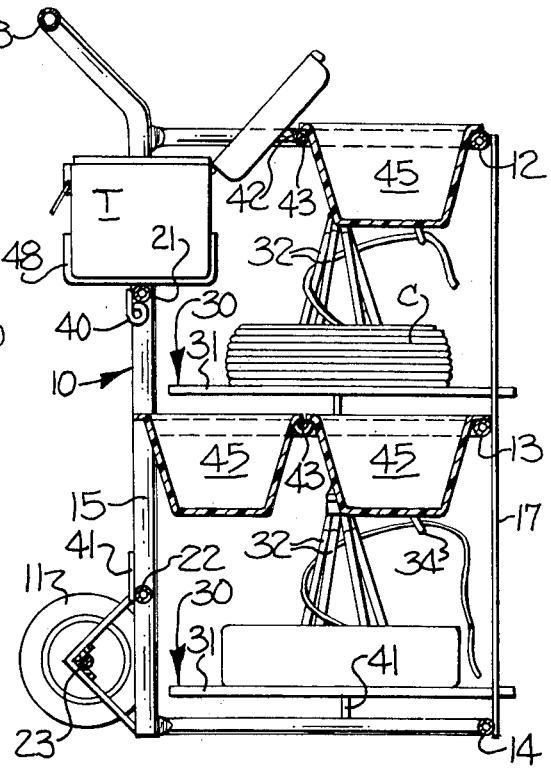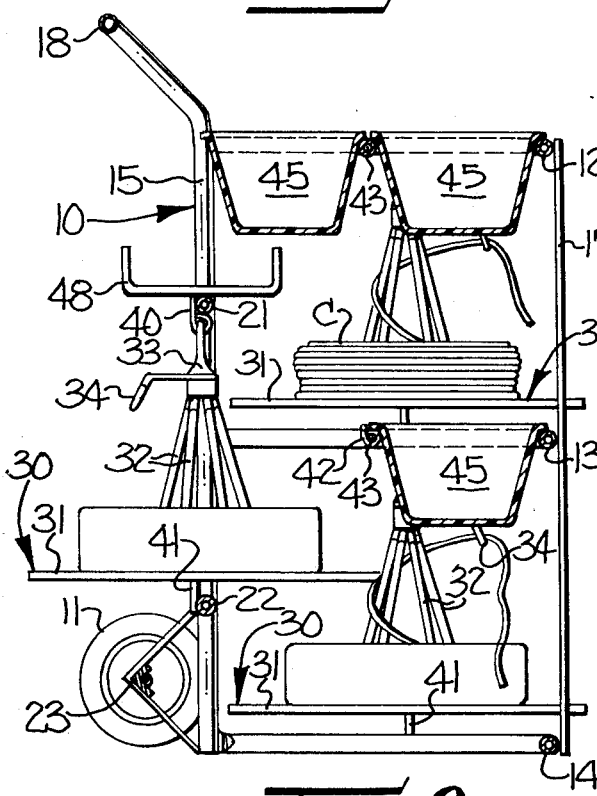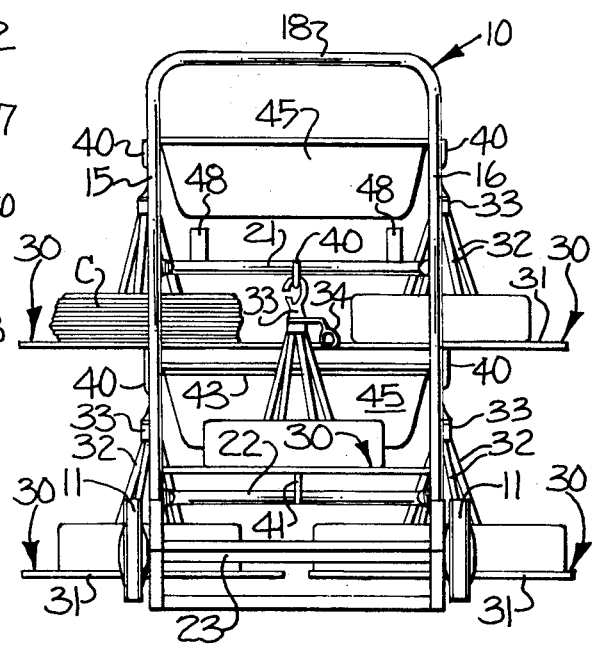

WHEELED CART FOR CARRYING AND DISPENSING WIRE

This invention relates to a wheeled cart particularly suited for use by electricians and adapted for carrying a supply of electrical wire thereon and for facilitating dispensing the wire, as needed, on a construction site.

The electrical wire normally used in commercial, residential, and industrial construction is of various types, differing in guage, number of conductors, color or composition of insulation, etc. Such wire is most commonly supplied in coiled form, either boxed or unboxed, and to a lesser extent on reels or spools.

To facilitate transporting the different types of wire needed on a construction site from one location to another, various kinds of carts have been proposed in the prior art. For example, reference is made to Zerg et al U.S. Pat. No. 3,304,025 and to Stillman U.S. Pat. No. 3,765,619. However, it will be noted that the carts disclosed in these patents are designed solely for use with coiled wire contained in boxes, and are not suited for carrying or dispensing unboxed coiled wire or spools of wire.

There is presently available, for use as an aid in carrying and dispensing coiled wire on the job, portable coiled wire supports or dispensers. These dispensers are adapted for use either with boxed or unboxed coiled wire, and when hung from a suitable support on the construction site, such as a rafter or a pipe, serve to facilitate unwinding the wire from the inner periphery of the coils as the wire is pulled by the workman. By way of example, reference is made to applicant's U.S. Pat. No. 3,729,092.

It has been proposed to hang the dispensers from a workman's truck or from a conventional grocery shopping cart provided with an attachment to suspend the dispensers therefrom. However, neither of these proposed arrangements are particularly suited for use on a construction site, where it is often necessary to move the wire from one level to another up or down stairs.

With the foregoing in mind, it is a primary object of this invention to provide a wheeled cart which is particularly designed for carrying a plurality of dispensers for coiled wire thereon and to facilitate transporting the wire from one location to another on a construction site.

More particularly, it is an object of this invention to provide a wheeled cart designed for carrying a plurality of dispensers for coiled wire in suspended relation thereon and wherein the dispensers are restricted from lateral movement during transporting of the wheeled cart from one location to another and also during withdrawing of the coiled wire.

It is another object of this invention to provide a wheeled cart of the type described also designed for versatility so as to permit readily changing the number or types of wire carried on the cart, or the arrangement thereof on the cart.

It is a further object of the invention to provide a versatile wheeled cart of the type described which is also adapted for carrying and dispensing wire from reels or spools as well as from coils.

It is a further object of the invention to provide a wheeled cart of the type described wherein tray means is provided adapted for receiving various tools or small items therein.

In accordance with the invention, the wheeled cart includes a wheeled skeletal frame having a plurality of upright and cross members. The upright members interconnect the cross members and support the cross members in vertically spaced relation with respect to one another to define open areas therebetween. At least one dispenser for coiled wire is suspended in the open area between two of the cross members. The dispenser has a generally horizontally oriented supporting base for supporting a coil or wire thereon and has suspending means connected to the supporting base and extending upwardly therefrom and being releasably connected to the upper of the two cross members. The suspending means includes means to permit rotation of the supporting base when wire is pulled from the coil to facilitate freely unreeling the wire. The skeletal frame further includes means on the lower of the cross members beneath the dispenser which cooperates with the supporting base of the dispenser to restrict lateral movement thereof so that the coiled wire dispenser is maintained substantially in its suspended position during movement of the wheeled cart from one location to another and during withdrawing of the wire from the coiled wire dispenser.

Some of the objects and advantages of the invention having been stated, others will appear as the detailed description of the invention proceeds, when taken in connection with the accompanying drawings, in which:

FIG. 7 is a sectional view of the wheeled cart illustrating another arrangement thereof wherein spools of wire are carried by the cart in addition to the coiled wire, and a tool box is carried on a rear portion of the frame;

FIG. 8 is a sectional view similar to FIG. 7 showing still another arrangement for the cart wherein trays are provided on the upper and intermediate levels thereof and a tool box is carried on a rear portion of the cart;

FIG. 9 is a sectional view illustrating still another arrangement for the cart wherein a pair of trays is provided on the upper level of the cart and a single tray is provided in the intermediate level of the cart; and FIG. 10 is a rear elevational view of the arrangement of the cart illustrated in FIG. 9.

Figure 2:
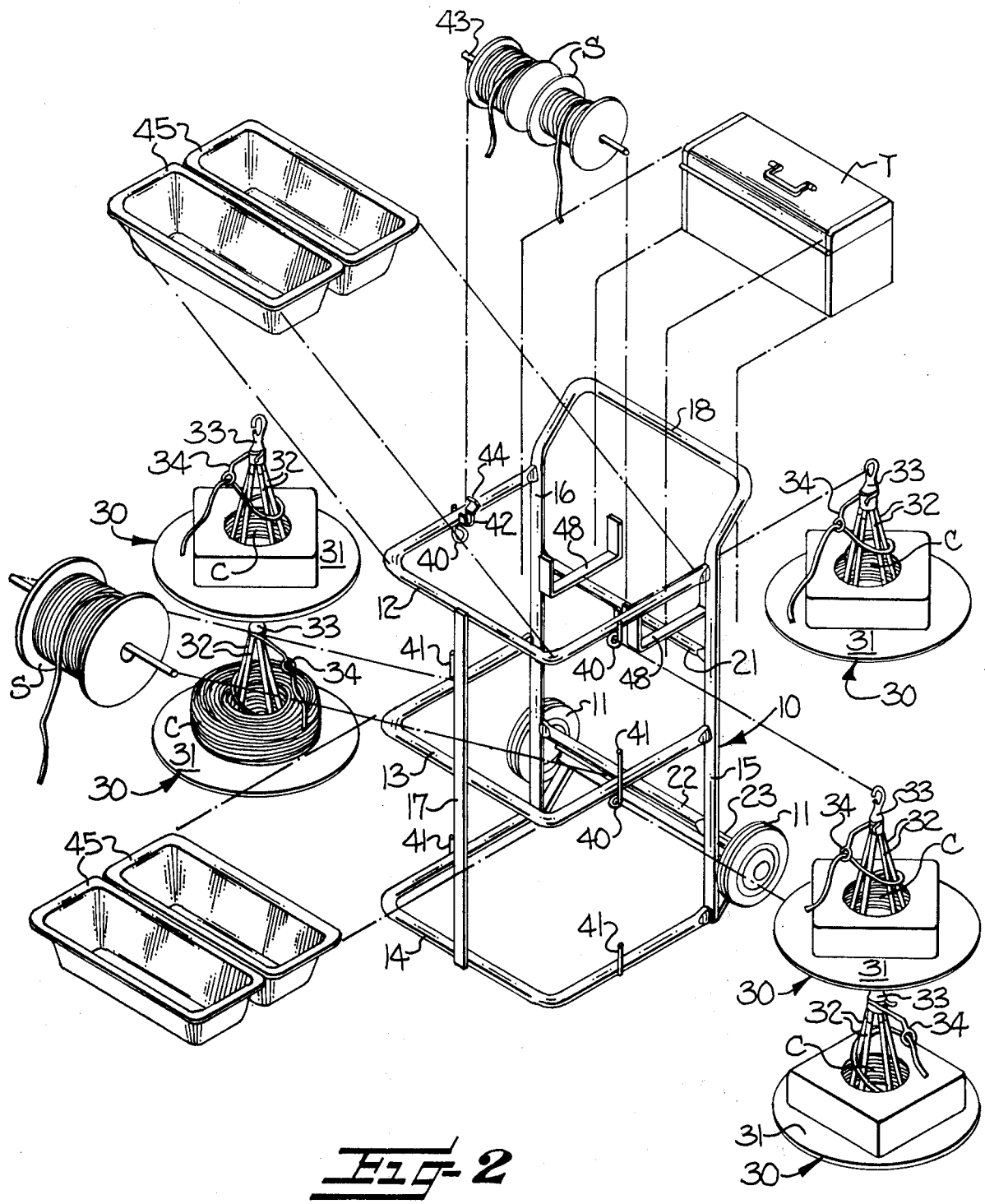
FIG. 2 is a somewhat diagrammatic exploded front perspective view of the cart showing the various different components which may be carried by the cart.
Figure 3:
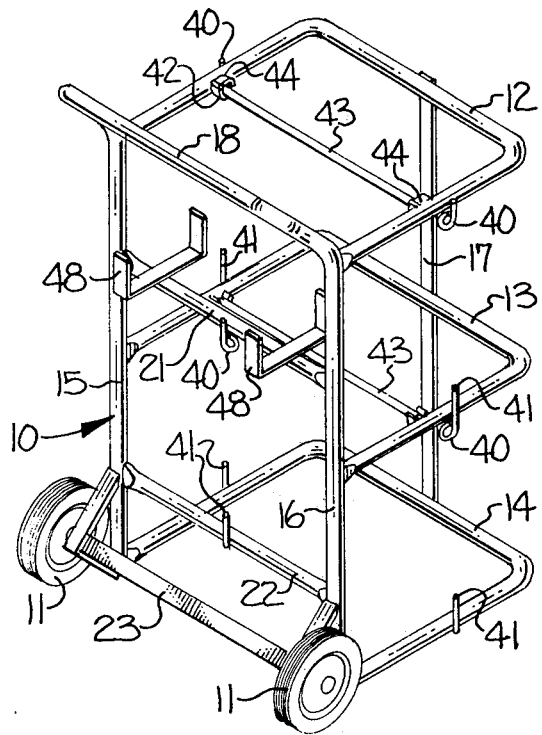
FIG. 3 is a rear perspective view of the cart without any of the wire dispensers or other components mounted thereon.
Figure 4:
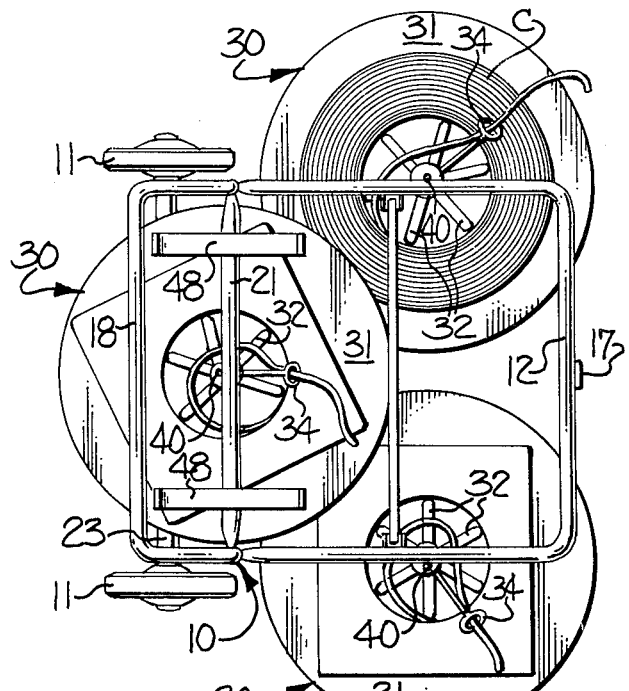
FIG. 4 is a top plan view of the cart showing wire dispensers mounted on the rear portion and on the lower forward portion thereof.

The wheeled cart of this invention, as illustrated in the drawings, comprises a skeletal frame, generally designated by the numeral 10, with wheels 11 attached to the lower rear portion of the frame. The frame is preferably formed from a lightweight tubular material, such as steel, and as may be seen most clearly in FIGS. 2 and 3, includes upper, intermediate, and lower generally U-shaped horizontal cross members 12, 13, and 14 respectively, which are interconnected and supported in spaced apart relation by vertical upright members 15, 16 and 17. More particularly, it will be seen that vertical members 15 and 16 extend between and interconnect corresponding terminal end portions of the U-shaped horizontal members 12, 13, 14, while vertical member 17 extends between and interconnects medial portions of the respective U-shaped horizontal members. As illustrated, the upper portions of the rearmost vertical members 15, 16 are joined together to form a handle 18 extending rearwardly and upwardly from the skeletal frame. Additional structural members 21 and 22 extend horizontally between the rearmost vertical members 15 and 16 to provide additional structural rigidity to the skeletal frame.

The wheels 11 are mounted rearwardly of the rearmost vertical members 15, 16 on a wheel supporting member 23 attached to the lower rear portion of vertical members 15, 16. The wheel supporting member 23 positions the wheels 11 so that the lowermost horizontal member 14 extends below the wheels 11 and engages the underlying floor when the skeletal frame is in the normal upright position. With the wheels 11 out of contact with the underlying floor, the cart remains stationary when wire is withdrawn therefrom by the workman. When it is desired to move the cart from one location to another, the wheels may be readily brought into contact with the floor by grasping the handle 18 and tilting the cart to the position shown in FIG. 5.

The cart is primarily designed for carrying and dispensing wire from coils. To this end, it will be seen that a plurality of dispensers for coiled wire, generally designated at 30, are suspended in the open areas between the spaced apart horizontal members 12, 13, and 14. The dispensers 30 are adapted for use both with boxed and unboxed coiled wire and serve to facilitate withdrawing wire from the coils without kinks or tangles. Each dispenser 30 includes a horizontally extending supporting base 31 for supporting a coil of wire C thereon with means extending upwardly from the base 31 for suspendingly supporting the same. As illustrated, a plurality of supporting members 32 are connected to the base near the center thereof and extend upwardly therefrom to a swivel connector 33. The swivel connector facilitates releasably connecting the dispenser to the frame while allowing the supporting base 31 to freely rotate when wire is being withdrawn from the coil. A guide 34 extending from the swivel connector helps guide the wire as it is being withdrawn from the inner periphery of the coil.

Figure 1:
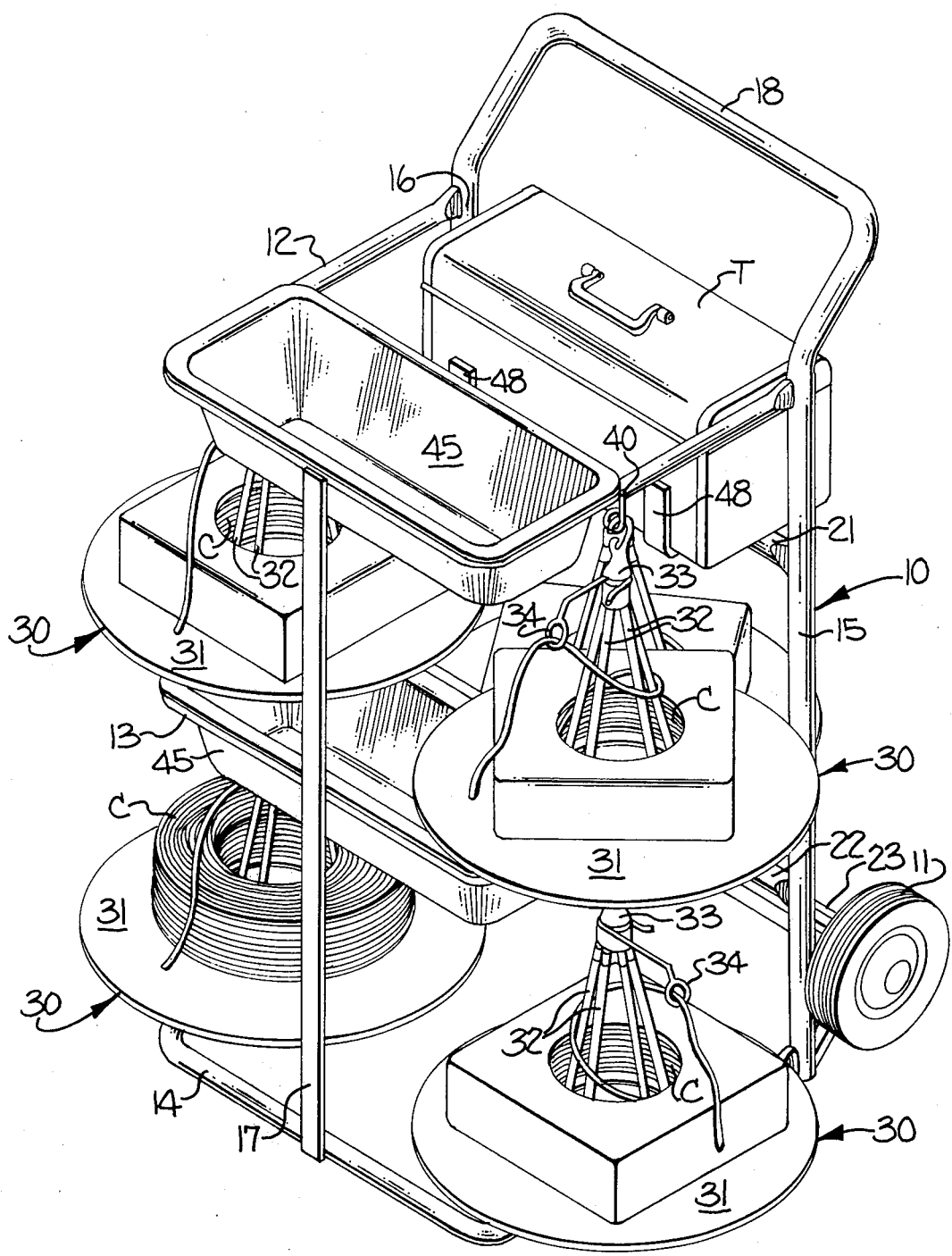
FIG. 1 is a front perspective view of the wheeled cart with a plurality of dispensers for coiled wire mounted thereon and illustrating one possible arrangement of the various components which may be carried by the cart.

As illustrated in FIG. 1, a pair of wire dispensers 30 are mounted in the open area between the upper and intermediate horizontal members 12, and 13, while another pair of wire dispensers are mounted therebeneath in the open area between the intermediate and lower horizontal members 13, 14. An additional dispenser 30 may be mounted at the rear of the cart between the horizontally extending structural members 21 and 22.

Figure 5:
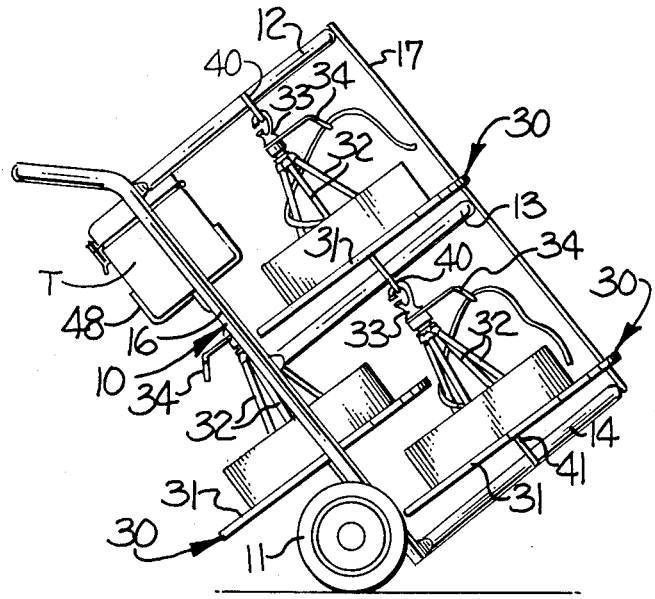
FIG. 5 is a side elevational view of the cart in a tilted position for being moved from one location to another, and illustrating how the wire dispensers are maintained substantially in their suspended position during movement of the wheeled cart from one location to another.
Figure 6:
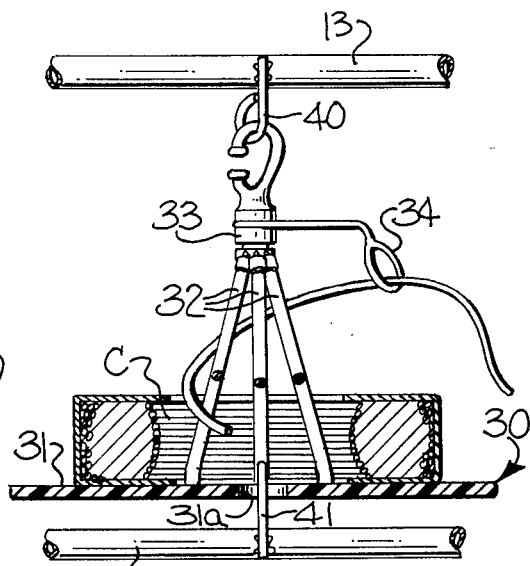
FIG. 6 is an enlarged detailed elevational view, partially in section, illustrating how the wire dispenser is suspended from the frame, and how lateral movement of the dispenser is restricted so as to maintain the wire dispenser substantially in its suspended position during movement of the wheeled cart.

The dispensers 30 are releasably connected at the upper ends thereof to respective eyebolts 40, which are welded or otherwise suitably secured to the horizontal members 12, 13 and to member 21. In addition, means in the form of upstanding studs 41 extend upwardly from the horizontal members directly beneath the coiled wire dispensers 30 for engaging the supporting bases 31 thereof to restrict lateral movement of the dispensers. More particularly, as seen best in FIG. 6, the stud 41 extends upwardly through an opening 31a provided at the center of the supporting base 31. Thus, the stud 41 cooperates with the eyebolts 40 to maintain the dispensers 30 substantially in their normally suspended positions while wire is being withdrawn from the dispensers and also when the cart is tilted for movement from one location to another as illustrated in FIG. 5.

In addition to dispensing wire from coils, the wheeled cart of the present invention is also adapted for carrying and dispensing wire from spools or reels. To this end, a pair of U-brackets 42 is provided on the opposing side portions of the upper and intermediate horizontal members 12 and 13. The U-brackets 42 are adapted for supportingly receiving a shaft 43 therein, upon which spools of wire S may be mounted. To maintain the shaft 43 in place, a clip 44 is provided cooperating with the brackets 42.

The cart is also adapted for carrying trays 45 for receiving tools or other small items therein. The trays may be arranged in various ways on the cart. For example, as illustrated in FIG. 1, a single tray may be mounted on each of the upper and intermediate horizontal members 12 and 13. This arrangement allows room for mounting a wire dispenser and a tool box from the rear portion of the cart. Alternatively, as illustrated in FIG. 8, a single tray may be mounted on the upper horizontal member 12, and a pair of trays mounted on the intermediate horizontal member 13. Of, if desired, a pair of trays may be mounted on the upper horizontal member 12, as illustrated in FIG. 9, with a single tray being provided on the intermediate horizontal member 13. In all of these arrangements, it will be seen that the trays are supported from a peripheral lip thereon which extends outwardly to engage portions of the horizontal member 12 or 13, and the spool supporting shaft 43.

If desired, the workman may mount his tool box on the cart. In this regard, it will be seen that brackets 48 are provided on the rear portion of the skeletal frame for receiving and supportingly carrying a tool box T therein.

From the foregoing, it will be seen that the cart of this invention has been designed particularly to meet the needs of a workman installing electrical wiring on a construction site. The cart is adapted to carry all of a workman's needed tools and materials, and is designed so that the workman may single handedly transport the tools and materials from one location to another on the construction site. The cart is of a size which permits it to easily pass through doorways, and may be readily pulled up or down stairs or ramps. The arrangement of the various wire dispensers, wire spools, trays, etc. may be readily varied to meet the needs of a particular job.

In the drawings and specification, there has been set forth a preferred embodiment of the invention, and although specific terms are employed, they are used in a generic and descriptive sense only and not for purposes of limitation.

That which is claimed is:

1. A wheeled cart adapted for facilitating transporting coiled wire from one location to another on a job site and for facilitating withdrawing the wire as needed, said wheeled cart comprising a wheeled skeletal frame having a plurality of upright and cross members, interconnected and defining open areas therebetween, at least one dispenser for coiled wire suspended in an open area between two cross members, said dispenser having a generally horizontally oriented supporting base for supporting a coil of wire thereon and having suspending means connected to the supporting base and extending upwardly therefrom and being releasably connected to the upper of said two cross members, said suspending means including means to permit rotation of the supporting base when wire is pulled from the coil to facilitate freely unreeling the wire, and means provided on the lower of said two cross members beneath said dispenser and cooperating with the supporting base of the dispenser to restrict lateral movement thereof during movement of the wheeled cart from one location to another and during withdrawing of wire from the dispenser.

2. A wheeled cart according to claim 1 wherein said means cooperating with the supporting base of said dispenser to restrict lateral movement thereof comprises means extending upwardly from the lower of said two cross members and engaging said supporting base while permitting rotation thereof.

3. A wheeled cart according to claim 1 including a horizontally extending shaft carried by at least certain of said cross members and being adapted for supporting spools of wire therefrom.

4. A wheeled cart according to claim 1 including tray means carried by at least certain of said cross members and being adapted for receiving tools or other small items therein.

5. A wheeled cart according to claim 1 wherein said cross members are of generally U-shaped configuration and are oriented with the terminal end portions thereof facing in a common direction, and wherein certain of said upright members extend between and interconnect corresponding terminal end portions of the U-shaped cross members.

6. A wheeled cart adapted for facilitating transporting coiled wire from one location to another on a job site and for facilitating withdrawing the wire as needed, said wheeled cart comprising a wheeled skeletal frame having upper, lower and intermediate cross members and a plurality of upright members interconnecting the cross members and supporting the same in vertically spaced relation with respect to one another to define open areas, therebetween, at least one dispenser for coiled wire suspended in the open area between said upper and intermediate cross members, said dispenser having a generally horizontally oriented supporting base for supporting a coil of wire thereon and having suspending means connected to the supporting base and extending upwardly therefrom and being releasably connected to said upper cross member, said suspending means including means to permit rotation of the supporting base when wire is pulled from the coil to facilitate freely unreeling the wire, and means provided on said intermediate cross member beneath said dispenser for engaging the supporting base of the dispenser to restrict lateral movement thereof during movement of the wheeled cart from one location to another and during withdrawing of wire from the dispenser.

7. A wheeled cart according to claim 6 including another of said dispensers suspendingly positioned in the open area between said intermediate and lower cross members and being releasably connected to said intermediate horizontal member, and means provided on said lower cross member beneath said last recited dispenser for engaging the supporting base thereof to restrict lateral movement of the dispenser.

8. A wheeled cart according to claim 6 wherein said cross members are substantially U-shaped, each having opposing spaced apart side portions with a medial portion extending between and interconnecting the side portions and defining a forward end of the skeletal frame and with terminal end portions of the cross members extending in a rearward direction, certain of said upright members interconnecting corresponding terminal end portions of the cross members, and at least one other upright member interconnecting medial portions of the cross members.

9. A wheeled cart according to claim 8 including handle means carried by the skeletal frame and extending rearwardly therefrom for facilitating guiding the wheeled cart from one location to another on the job site.

10. A wheeled cart according to claim 8 including bracket means connected to a rear portion of the skeletal frame and adapted for supportingly receiving a tool box therein.

11. A wheeled cart adapted for facilitating transporting coiled wire from one location to another on a job site and for facilitating withdrawing the wire as needed, said wheeled cart comprising an upright skeletal frame having a plurality of upright and cross members interconnected and defining open areas therebetween, handle means provided on the upper portion of one side of the skeletal frame, wheel means connected to a lower portion of the skeletal frame below said handle means, said wheel means being so positioned on the skeletal frame that the skeletal frame extends therebelow and the wheel means is out of contact with the underlying supporting surface when the frame is in the upright position and so that the wheel means may be readily brought into contact with the underlying supporting surface by tilting the wheeled cart when it is desired to move the cart from one location to another, at least one dispenser for coiled wire suspended in an open area between two cross members, said dispenser having a generally horizontally oriented supporting base for supporting a coil of wire thereon and having suspending means connected to the supporting base and extending upwardly therefrom and being releasably connected to the upper of said two cross members, said suspending means including means to permit rotation of the supporting base when wire is pulled from the coil to facilitate freely unreeling the wire, and means provided on the lower of said two cross members beneath said dispenser and cooperating with the supporting base of the dispenser to restrict lateral movement thereof during movement of the wheeled cart from one location to another and during withdrawing of wire from the dispenser.

12. A wheeled cart adapted for facilitating transporting coiled wire from one location to another on a job site and for facilitating withdrawing the wire, as needed, from wire dispensers, said wheeled cart comprising a wheeled skeletal frame having a plurality of upright and cross members, interconnected and defining open areas therebetween, connector means provided on at least certain of said cross members for supportingly suspending a dispenser for coiled wire therefrom in an open area therebelow, and means provided on another cross member positioned below said certain cross member and extending upwardly therefrom for engaging the dispenser and restricting lateral movement thereof during movement of the wheeled cart from one location to another and during withdrawing of wire from the dispensers.

13. A wheeled cart according to claim 12 wherein said connector means for supportingly suspending a dispenser for coiled wire therefrom comprises eye means carried by said certain cross members and extending downwardly therefrom and being adapted for releasable connection with the upper end of a dispenser for coiled wire.

14. A wheeled cart according to claim 12 wherein said means for engaging the dispenser and restricting lateral movement thereof comprises stud means positioned beneath and substantially in alignment with said connector means and extending upwardly for engaging the underside of a dispenser for coiled wire suspended from the connector means.

15. A wheeled cart according to claim 12 wherein said cross members have opposing spaced apart portions, and wherein means is provided on the opposing spaced apart portions of at least certain of said cross members adapted for supportingly receiving a shaft therebetween for supporting spools of wire thereon.

16. A wheeled cart adapted for facilitating transporting coiled wire from one location to another on a job site and for facilitating withdrawing the wire, as needed, from wire dispensers, said wheeled cart comprising an upright skeletal frame having upper, lower and intermediate substantially U-shaped horizontal cross members and a plurality of vertical upright members interconnecting the horizontal cross members and supporting the same in vertically spaced apart relation with respect to one another to define open areas therebetween, handle means provided on the upper portion of one side of the skeletal frame, wheel means connected to a lower portion of the skeletal frame below said handle means, said wheel means being so positioned on the skeletal frame that the skeletal frame extends therebelow and the wheel means is out of contact with the underlying supporting surface when the frame is in the upright position, and so that the wheel means may be readily brought into contact with the underlying supporting surface by tilting the wheeled cart when it is desired to move the cart from one location to another, connector means provided on the upper and intermediate horizontal cross members for supportingly suspending respective dispensers for coiled wire therefrom in the open areas defined therebelow, and means provided on the intermediate and lower horizontal cross members and extending upwardly therefrom and cooperating respectively with said connector means for engaging the respective dispensers and restricting lateral movement thereof whereby each dispenser is maintained substantially in its suspended position during movement of the wheeled cart from one location to another and during withdrawing of wire from the dispensers.

17. A wheeled cart according to claim 16 including a plurality of structural members extending horizontally between and interconnecting said respective vertical upright members, said horizontally extending structural members being vertically spaced apart from one another and vertically offset from said U-shaped horizontal cross members, connector means provided on the uppermost of said plurality of horizontally extending structural members for supportingly suspending a coiled wire dispenser therefrom in the open area defined therebelow, and means provided on the next horizontally extending structural member below said uppermost structural member and extending upwardly therefrom for engaging the coiled wire dispenser and restricting lateral movement thereof and thereby maintaining the same substantially in its suspended position on the skeletal frame.

* * * * *

UNITED STATES PATENT OFFICE
CERTIFICATE OF CORRECTION

PATENT NO. : 3,990,653
DATED : November 9, 1976
INVENTOR(S) : William B. Marcell It is certified that error appears in the above-identified patent and that said Letters Patent are hereby corrected as shown below:

Column 2, Line 10, "or" should be --of--. Column 4, Line 39, "Of" should be --Or--.

Column 6, CLAIM 7, Line 7, "horizontal" should be --cross--.

Signed and Sealed this

First Day of March 1977

[SEAL]

Attest:

RUTH C. MASON
Attesting Officer

C. MARSHALL DANN
Commissioner of Patents and Trademarks